(12) United States Patent
Lee et al.

(10) Patent No.: US 7,450,373 B2
(45) Date of Patent: Nov. 11, 2008

(54) INFORMATION HANDLING SYSTEM CHASSIS FOOT

(75) Inventors: Jason Lee, Austin, TX (US); Patrick V. Illingworth, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 182 days.

(21) Appl. No.: 11/533,862

(22) Filed: Sep. 21, 2006

(65) Prior Publication Data

US 2008/0074831 A1 Mar. 27, 2008

(51) Int. Cl.
*G06F 1/16* (2006.01)
(52) U.S. Cl. ............... 361/683; 361/679; 248/346.03
(58) Field of Classification Search ........... 361/679, 361/680, 683; 248/346.03
See application file for complete search history.

(56) References Cited

U.S. PATENT DOCUMENTS

| | | | | |
|---|---|---|---|---|
| 4,923,158 A | * | 5/1990 | Saisho | 248/188.8 |
| 5,808,863 A | * | 9/1998 | Radloff et al. | 361/683 |
| 6,351,380 B1 | * | 2/2002 | Curlee et al. | 361/695 |
| 6,498,719 B1 | | 12/2002 | Bridges | |
| 6,654,237 B1 | | 11/2003 | Lee | |
| 6,809,916 B2 | * | 10/2004 | Nakata et al. | 361/115 |
| 7,079,383 B2 | | 7/2006 | Homer | |
| 7,095,610 B1 | * | 8/2006 | Banko | 361/683 |

OTHER PUBLICATIONS

Kevin Mundt and Patrick Illingworth, U.S. Appl. No. 11/342,156, filed Jan. 27, 2006.
Patrick Illingworth and Jason J. Lee, Notebook Rubber Foot Design Guideline, Dell Controlled Print, Process Document Work Instruction, No.: ENG0000198; Description: NB Rubber Foot Design Guideline, Revision: A01, 23 pages, Dell, Inc., Austin, Texas.

* cited by examiner

*Primary Examiner*—Michael C Zarroli
(74) *Attorney, Agent, or Firm*—Haynes and Boone, LLP

(57) ABSTRACT

A chassis foot apparatus includes a base member. A resilient member is coupled to the base member. At least one post extends from the base member. The at least one post is deformable into engagement with a chassis to couple the base member and the resilient member to the chassis.

19 Claims, 7 Drawing Sheets

INFORMATION HANDLING SYSTEM CHASSIS FOOT

BACKGROUND

The present disclosure relates generally to information handling systems, and more particularly to an information handling system chassis foot.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Most IHSs are housed in an IHS chassis that houses some or all of the components of the IHS. When the IHS chassis is placed on a work surface, there may not be enough friction between the IHS chassis and the work surface, which can result in the IHS chassis sliding relative to the work surface.

Typically, in order to increase the coefficient of friction between the IHS chassis and the work surface such that the IHS chassis will not slide relative to the work surface, rubber elastomer feet are adhered to the bottom surface of the IHS chassis. These feet are also used to protect the hard disk drive in the IHS chassis by reducing shock responses when the chassis is dropped. Conventional methods for coupling the feet to the IHS chassis include applying an adhesive between the foot and the IHS chassis to secure the foot to the IHS chassis.

However, such conventional methods are susceptible to the peeling or shearing off of the feet from the IHS chassis. This can be a result of the foot being made of a compliant, flexible material that is sandwiched between the rigid IHS chassis and the rigid work surface such that when the IHS chassis is slid across the work surface, the foot may roll, shear, and/or peel away from the IHS chassis. This can also be due to most feet being at least partially fabricated from a silicone material that doesn't bond well to the adhesive, and/or the process by which the adhesive is applied to the foot and/or the IHS chassis. In some cases, to ensure proper adhesion, very detailed adhesive bonding processes that depend on controlling the application pressure, time, and temperature, and guaranteeing a contaminant free environment must be used to adhere the feet to the IHS chassis. This can raise costs and manufacture times for the IHS chassis.

Accordingly, it would be desirable to provide for an IHS chassis foot absent the disadvantages found in the prior methods discussed above.

SUMMARY

According to one embodiment, a chassis foot apparatus includes a base member, a resilient member coupled to the base member, and at least one post extending from the base member, wherein the at least one post is deformable into engagement with a chassis to couple the base member and the resilient member to the chassis.

BRIEF DESCRIPTION OF THE DRAWINGS

FIG. 3b is a cut-away perspective view illustrating an embodiment of the chassis foot apparatus of FIG. 3a.

FIG. 3c is a cross sectional view illustrating an embodiment of the chassis foot apparatus of FIG. 3a.

FIG. 4b is a cross sectional view illustrating an embodiment of a foot coupling section on the IHS chassis of FIG. 4a.

FIG. 7a is a cross sectional view illustrating an embodiment of a foot coupling section on the IHS chassis of FIG. 4a.

FIG. 7b is a cross sectional view illustrating an embodiment of the chassis foot apparatus of FIGS. 3a, 3b and/or 3c being coupled to the chassis of FIGS. 4a and 7a.

FIG. 7c is a cross sectional view illustrating an embodiment of the chassis foot apparatus of FIGS. 3a, 3b and/or 3c coupled to the chassis of FIGS. 4a and 7a.

DETAILED DESCRIPTION

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
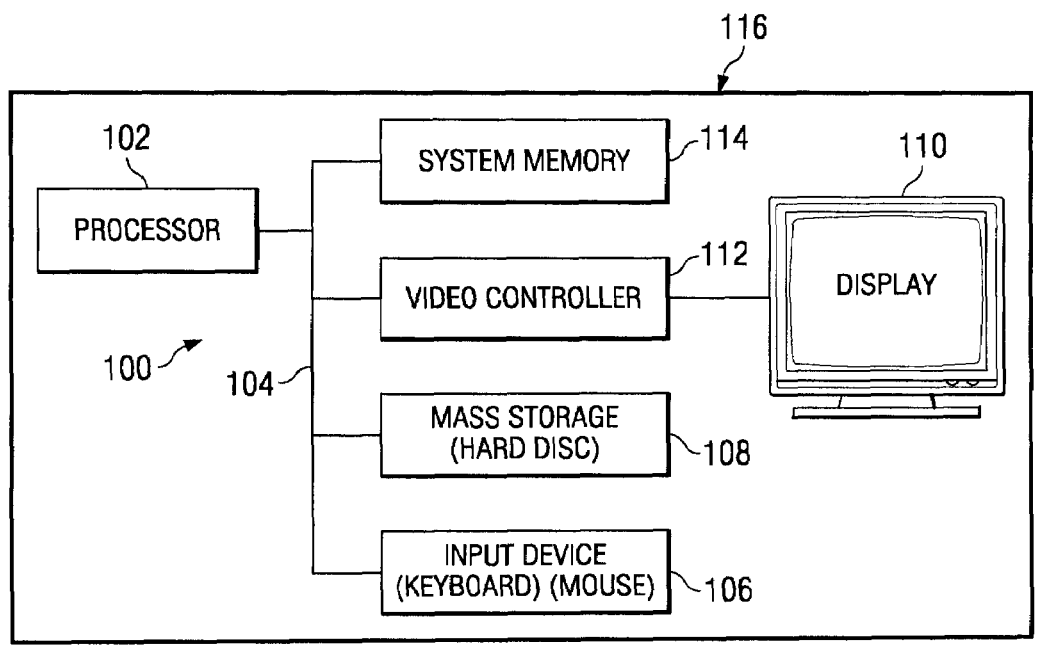
FIG. 1 is a schematic view illustrating an embodiment of an IHS.

In one embodiment, IHS 100, FIG. 1, includes a processor 102, which is connected to a bus 104. Bus 104 serves as a connection between processor 102 and other components of computer system 100. An input device 106 is coupled to processor 102 to provide input to processor 102. Examples of input devices include keyboards, touchscreens, and pointing devices such as mouses, trackballs and trackpads. Programs and data are stored on a mass storage device 108, which is coupled to processor 102. Mass storage devices include such devices as hard disks, optical disks, magneto-optical drives, floppy drives and the like. IHS 100 further includes a display 110, which is coupled to processor 102 by a video controller 112. A system memory 114 is coupled to processor 102 to provide the processor with fast storage to facilitate execution of computer programs by processor 102. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
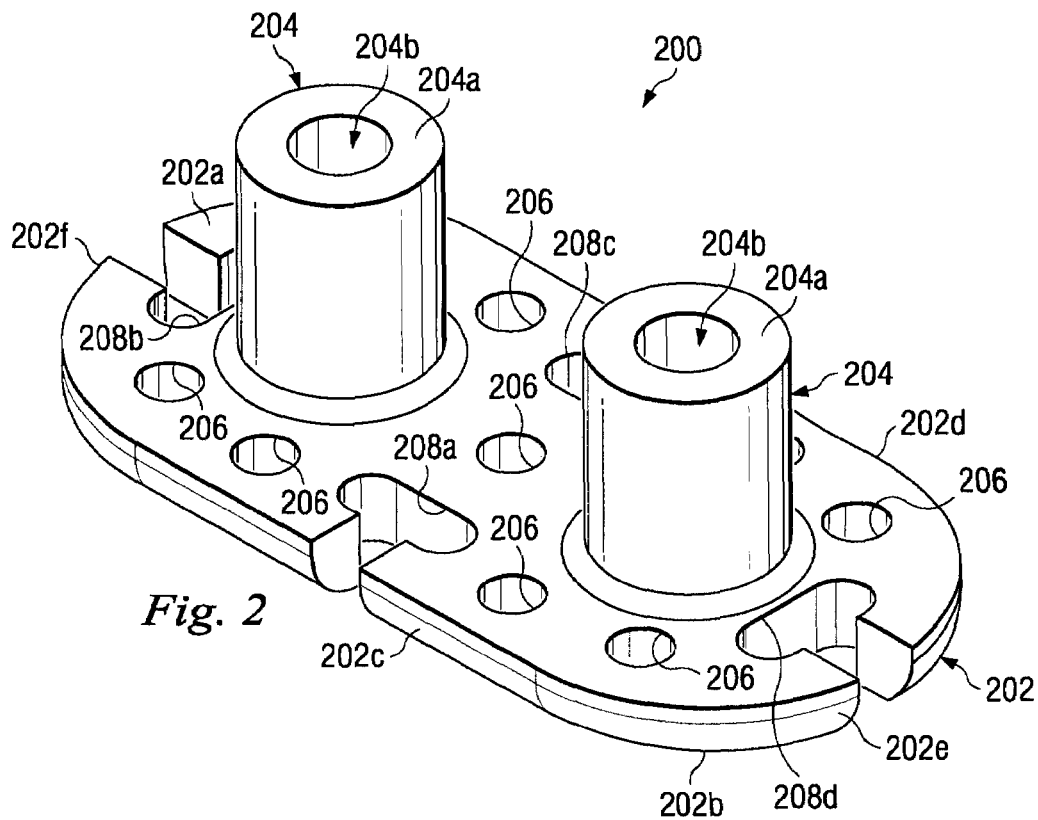
FIG. 2 is a perspective view illustrating an embodiment of a base member.

Referring now to FIG. 2, a base member 200 is illustrated. The base member 200 includes a base 202 having a top surface 202a, a bottom surface 202b located opposite the top surface 202a, a front edge 202c extending between the top surface 202a and the bottom surface 202b, a rear edge 202d extending between the top surface 202a and the bottom surface 202b and located opposite the front edge 202c, and a pair of opposing side edges 202e and 202f extending between the top surface 202a, the bottom surface 202b, the front edge 202c, and the rear edge 202d. A pair of posts 204 extend from the top surface 202a of the base 202 in a substantially symmetrical orientation on the base 202, each post 204 including a top surface 204a and defining a hole 204b extending into the post 204 from the top surface 204a and at least partially along the length of the post 204 such that a cylinder is included on the posts 204 at least partially along the length of the posts 204. In an embodiment, the posts 204 may not define the hole 204b and may instead be solid. A plurality of first mechanical coupling apertures 206 are defined by the base 202, are located in a spaced apart orientation on the base 202 from each other, and extend through the base 202 from the top surface 202a to the bottom surface 202b. A plurality of second mechanical coupling apertures 208a, 208b, 208c and 208d are defined by the base 202, located adjacent the front surface 202c, the side surface 202f, the rear surface 202d, and the side surface 202e, respectively, and extend through the base 202 from the top surface 202a to the bottom surface 202b. In an embodiment, the base member 200 is fabricated in the first step of a two shot molding process. In an embodiment, the base member 200 is fabricated from a plastic material such as, for example, a Polycarbonate/Acrylonitrile Butadiene Styrene (PC/ABS) blend or a variety of other plastic materials known in the art.

Figure 3A:
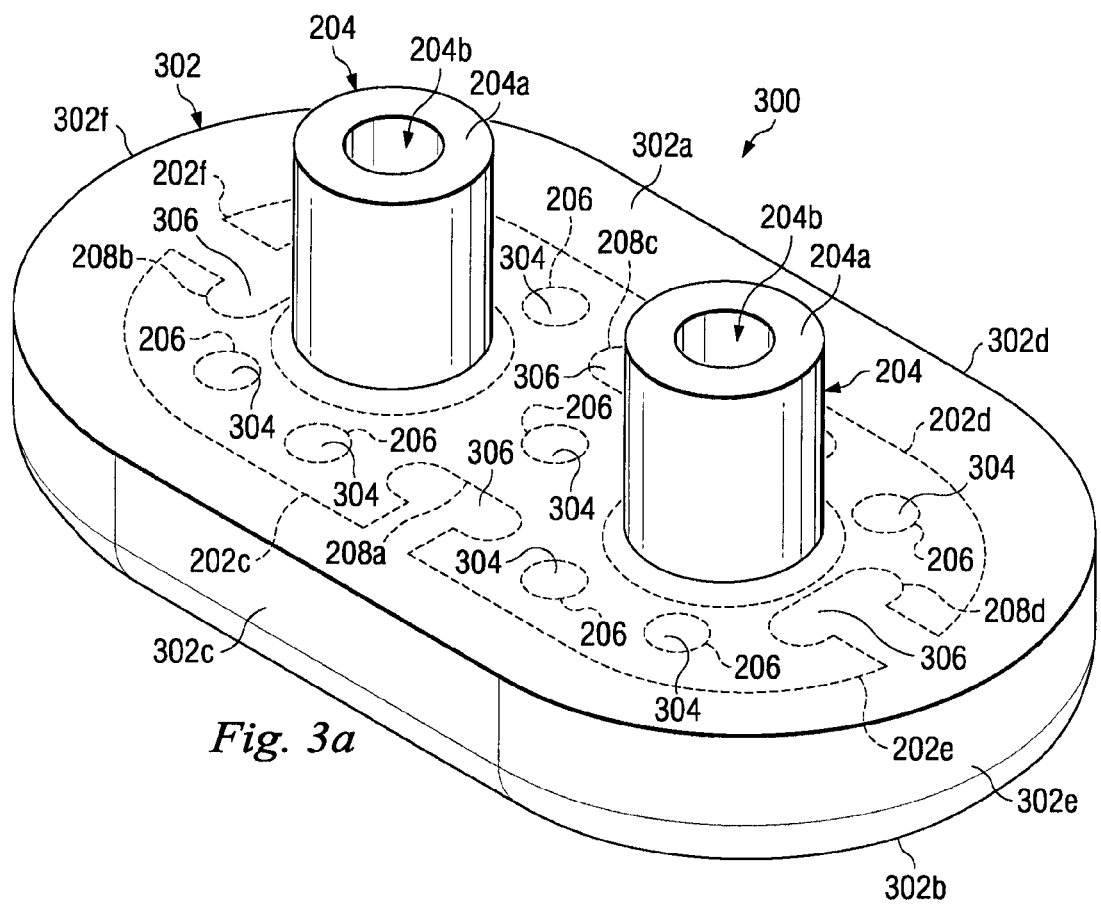
FIG. 3a is a perspective view illustrating an embodiment of a chassis foot apparatus including a resilient member and the base member of FIG. 2.
Figure 3B:
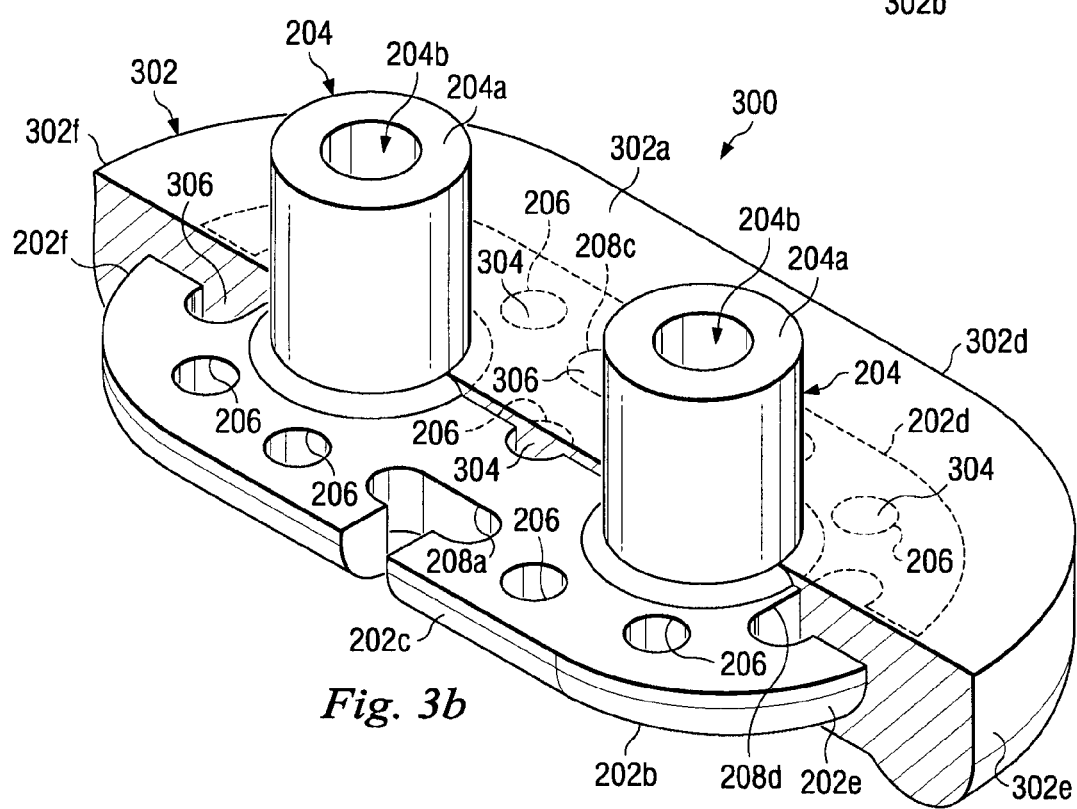
Figure 3C:
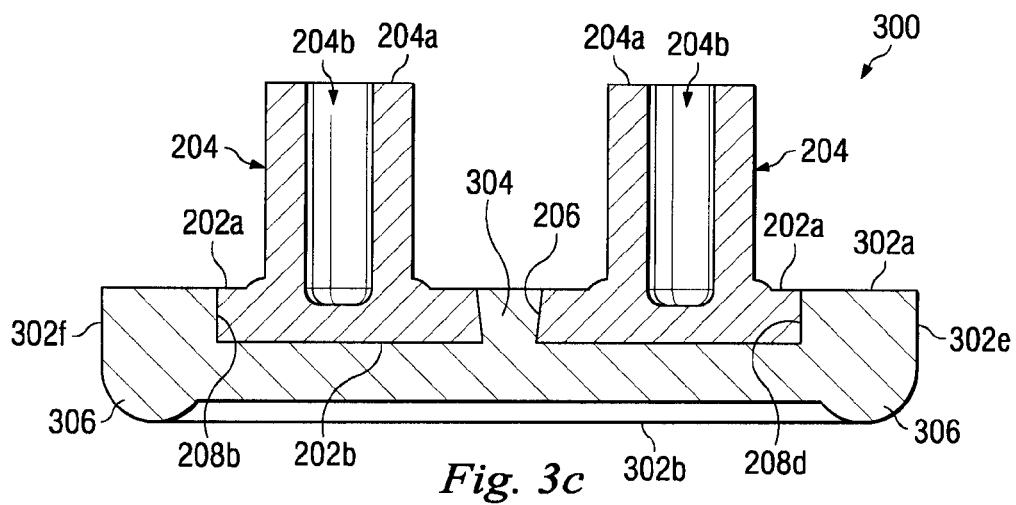

Referring now to FIGS. 3a, 3b and 3c, a chassis foot apparatus 300 is illustrated. The chassis foot apparatus includes the base member 200. A resilient member 302 is coupled to the base member 200 and includes a top surface 302a, a bottom surface 302b located opposite the top surface 302a, a front edge 302c extending between the top surface 302a and the bottom surface 302b, a rear edge 302d extending between the top surface 302a and the bottom surface 302b and located opposite the front edge 302c, and a pair of opposing side edges 302e and 302f extending between the top surface 302a, the bottom surface 302b, the front edge 302c, and the rear edge 302d. The resilient member 302 is oriented with respect to the base member 200 such that the resilient member 302 substantially surrounds the base member 200 with the top surface 302a of the resilient member 302 located adjacent the top surface 202a of the base member 200, the front edge 302c of the resilient member 302 located adjacent the front edge 202c of the base member 200, the rear edge 302d of the resilient member 302 located adjacent the rear edge 202d of the base member 200, and the side edges 302e and 302f of the resilient member 302 located adjacent the side edges 202e and 202f, respectively, of the base member 200. The resilient member 302 includes portions 304 that extend through the first mechanical coupling apertures 206 defined by the base member 200. The resilient member 302 also includes portions 306 that extend through the second mechanical coupling apertures 208a, 208b, 208c and 208d. In an embodiment, the top surface 302a of the resilient member 302 may be located above the top surface 202a of the base member 200 such that a layer of the resilient member 302 material exists above the base 202 of the base member 200, as illustrated in FIGS. 3a and 3b. In an embodiment, the top surface 302a of the resilient member 302 may be level with the top surface 202a of the base member 200, and the first mechanical coupling apertures 206 may be tapered such that their widths are greater adjacent the top surface 202a of the base member 202 than they are adjacent the bottom surface 202b of the base member 202, as illustrated in FIG. 3c. In an embodiment, the resilient member 302 is fabricated in the second step of a two shot molding process, the first step of which fabricated the base member 200. In an embodiment, the resilient member 302 may be fabricated from a resilient material such as, for example, a Bayer Desmopan 900 series Thermoplastic Polyurethane (TPU) poly ester base rubber elastomer or a variety of other resilient materials known in the art. In an embodiment, the materials used to fabricate the base member 200 and the resilient member 302 are chosen such that a chemical bond exists between the base member 200 and the resilient member 302 and couples the base member 200 and the resilient member 302 together.

Figure 4A:
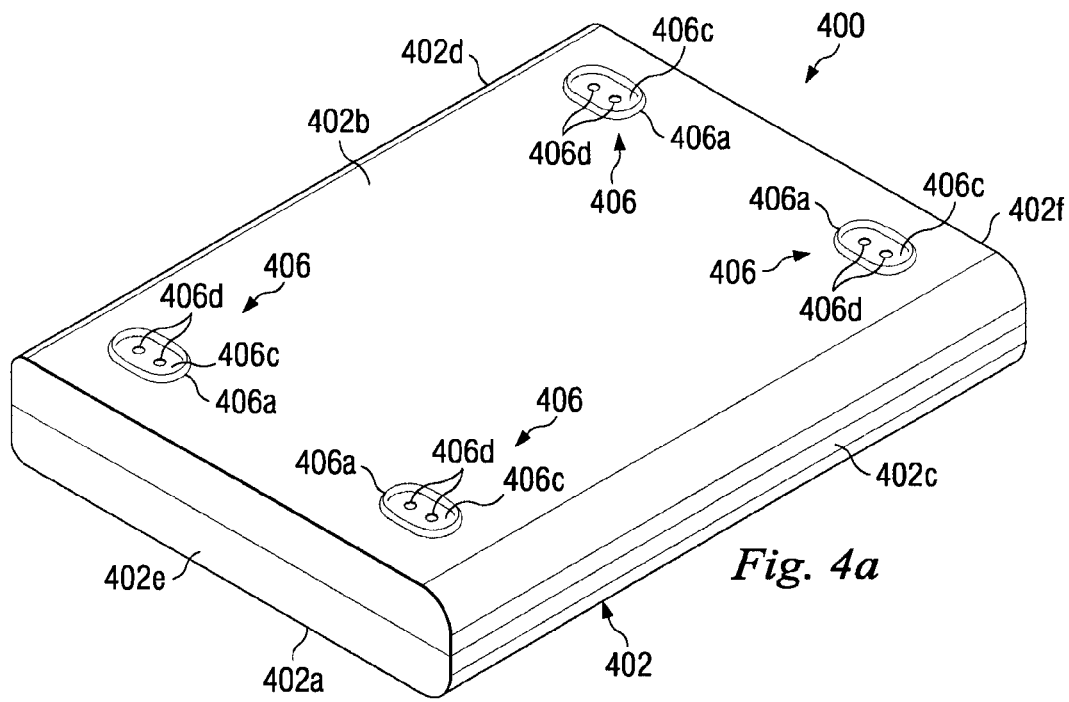
FIG. 4a is a perspective view illustrating an embodiment of an IHS chassis used with the chassis foot apparatus of FIGS. 3a, 3b and/or 3c.
Figure 4B:
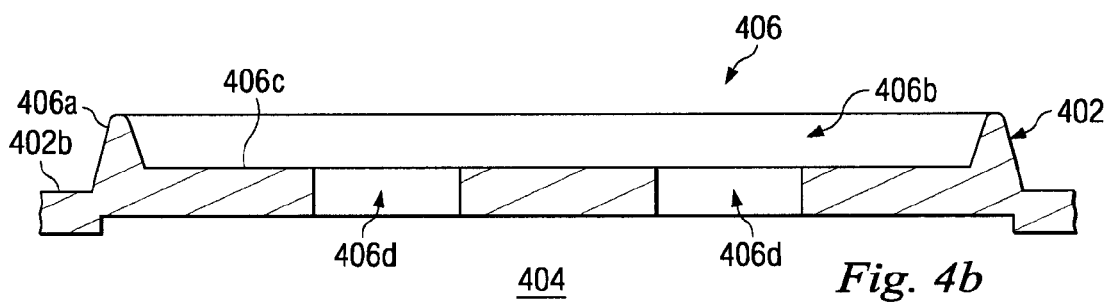

Referring now to FIGS. 4a and 4b, an IHS chassis 400 is illustrated. In an embodiment, the IHS chassis 400 may be, for example, the chassis 116, described above with respect to FIG. 1, and may house some or all of the components of the IHS 100, described above with respect to FIG. 1. The IHS chassis 400 includes a base 402 having a top surface 402a, a bottom surface 402b located opposite the top surface 402a, a front edge 402c extending between the top surface 402a and the bottom surface 402b, a rear edge 402d extending between the top surface 402a and the bottom surface 402b and located opposite the front edge 402c, and a pair of opposing side edges 402e and 402f extending between the top surface 402a, the bottom surface 402b, the front edge 402c, and the rear edge 402d. An IHS housing 404 is defined by the IHS chassis 400 and located between the top surface 402a, the bottom surface 402b, the front edge 402c, the rear edge 402d, and the side edges 402e and 402f. A plurality of foot coupling sections 406 are located on the bottom surface 402b of the IHS chassis 400 in a spaced apart orientation from each other and adjacent the four corners of the bottom surface 402b. Each foot coupling section 406 includes an oval shaped lip 406a that extends from the bottom surface 402b of the IHS chassis and defines a chassis foot apparatus channel 406b within the lip 406a that is approximately the shape of the perimeter of the resilient member 302, illustrated in FIGS. 3a, 3b and 3c. A chassis foot apparatus engagement surface 406c is located adjacent the chassis foot apparatus surface 402b and the lip 402a. A foot apertures 406d extend through the base 402 from the chassis foot apparatus engagement surface 406c and to the IHS housing 404. A chassis foot apparatus securing surface 406e is located on the base 402 opposite the chassis foot apparatus engagement surface 406c and adjacent the foot apertures 406d. Although the IHS chassis 400 has been illustrated as a notebook chassis, the IHS chassis 400 may be a desktop chassis, a server chassis, and/or a variety of other chassis known the art.

Figure 5A:
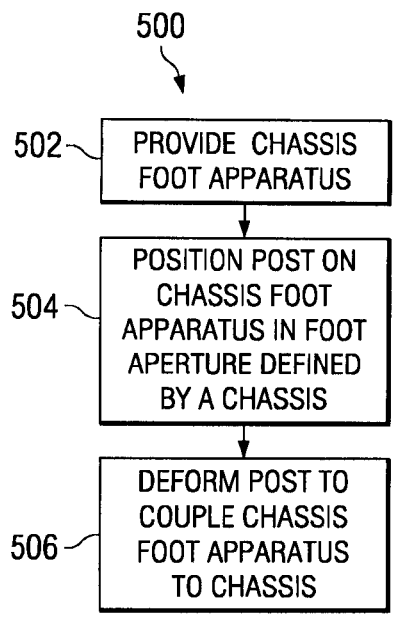
FIG. 5a is a flow chart illustrating an embodiment of a method for coupling a chassis foot to a chassis.
Figure 5B:
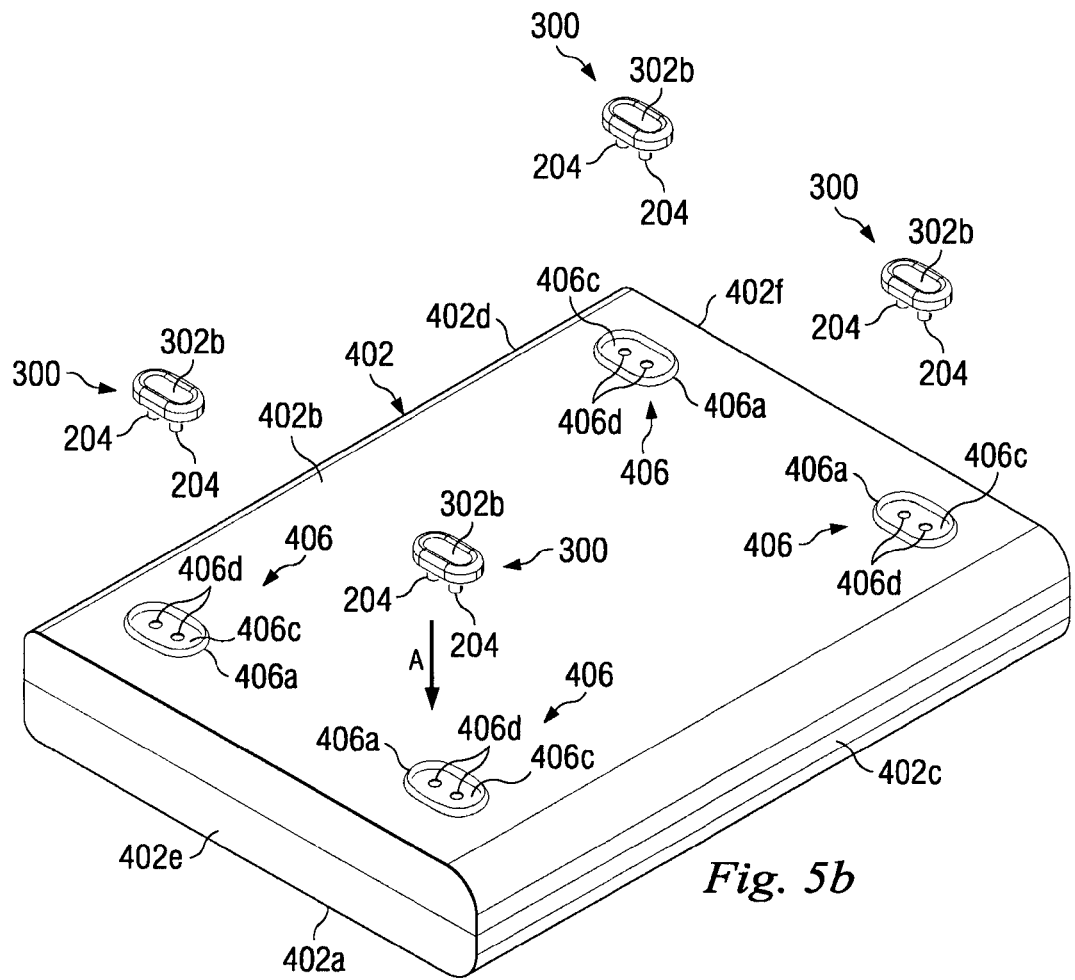
FIG. 5b is a perspective view illustrating an embodiment of a plurality of the chassis foot apparatus of FIGS. 3a, 3b and/or 3c being coupled to the chassis of FIGS. 4a and 4b.
Figure 5C:
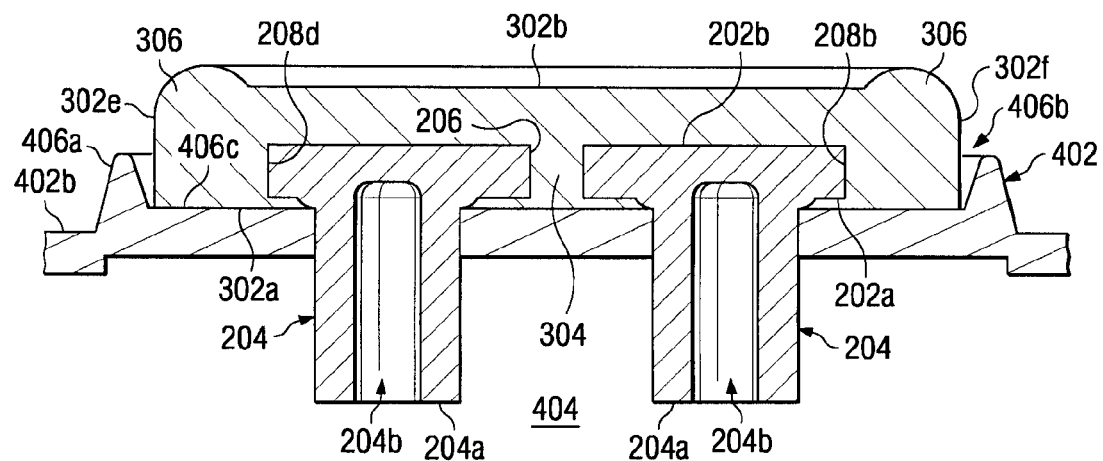
FIG. 5c is a cross sectional view illustrating an embodiment of the chassis foot apparatus of FIGS. 3a, 3b and/or 3c being coupled to the chassis of FIGS. 4a and 4b.

Referring now to FIGS. 3a, 3b, 5a, 5b and 5c, a method 500 for coupling a chassis foot to a chassis is illustrated. The method 500 begins at step 502 where the chassis foot apparatus 300, illustrated in FIGS. 3a and 3b, is provided. The method 500 then proceeds to step 504, where the posts 204 on the chassis foot apparatus 300 are positioned in the foot apertures 406d defined by the chassis 400. The chassis foot apparatus 300 are positioned adjacent respective foot coupling sections 406 such that the posts 204 on each chassis foot apparatus 300 are aligned with the foot apertures 406d defined by the base 402 of the IHS chassis 400, as illustrated in FIG. 5b. In an embodiment, the symmetrical positioning of the posts 204 on the chassis foot apparatus 300 and the symmetrical positioning of the foot apertures 406d on the foot coupling sections 406 prevent the chassis foot apparatus 300 from being installed in an incorrect orientation on the IHS chassis 400. The chassis foot apparatus 300 is then moved in a direction A such that the chassis foot apparatus 300 is positioned in the chassis foot apparatus channel 406b and engages the chassis foot apparatus securing surface 406c while the posts 204 enter and extend through respective foot apertures 406d such that the distal ends of the posts 204 are located in the IHS housing 404, as illustrated in FIG. 5c. In an embodiment, an adhesive such as, for example, 3M 9888T, 3M 9672LE, Nitto 5114, and/or a variety of other adhesives known in the art, is positioned between the chassis foot apparatus 300 and the chassis foot apparatus securing surface 406c by applying the adhesive to the chassis foot apparatus 300 and/or the chassis foot apparatus securing surface 406c before their engagement.

Figure 5D:
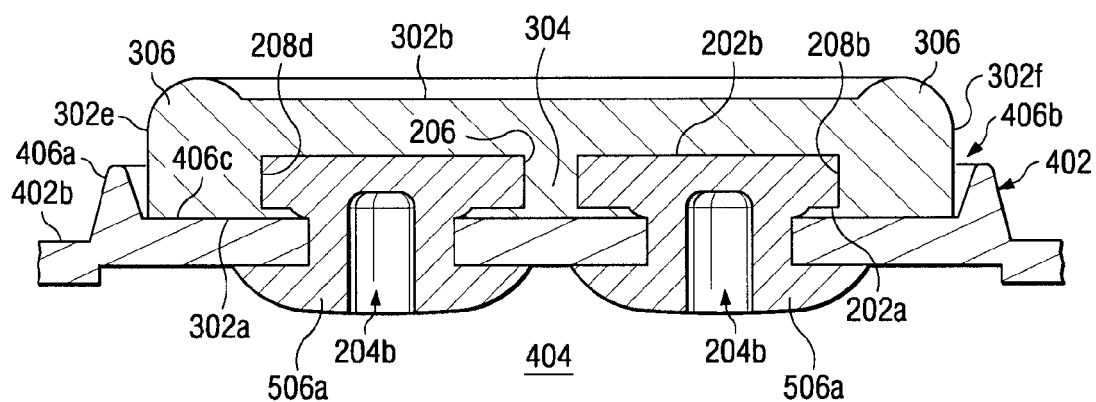
FIG. 5d is a cross sectional view illustrating an embodiment of the chassis foot apparatus of FIGS. 3a, 3b and/or 3c coupled to the chassis of FIGS. 4a and 4b.

Referring now to FIGS. 5a and 5d, the method 500 proceeds to step 506 where the posts 204 are deformed to couple the chassis foot apparatus 300 to the IHS chassis 400. The posts 204 are deformed such that post securing ends 506a are created that engage the chassis foot apparatus securing surface 406e, illustrated in FIG. 5d, and couple and secure the chassis foot apparatus 300 to the IHS chassis 400. In an embodiment, the posts 204 are deformed by a heat staking process known in the art that deforms the posts 204 to form the post securing ends 506a. In an embodiment, the posts 204 are deformed by a sonic welding process known in the art that deforms the posts 204 to form the post securing ends 506a. In an embodiment, a variety of other techniques known in the art may be used to deform the posts 204 and create the post securing ends 506a and couple and secure the chassis foot apparatus 300 to the IHS chassis 400. Thus, a chassis foot apparatus 300 is provided which provides an IHS chassis foot that includes a stronger coupling to the IHS chassis relative to conventional chassis feet.

Figure 6:
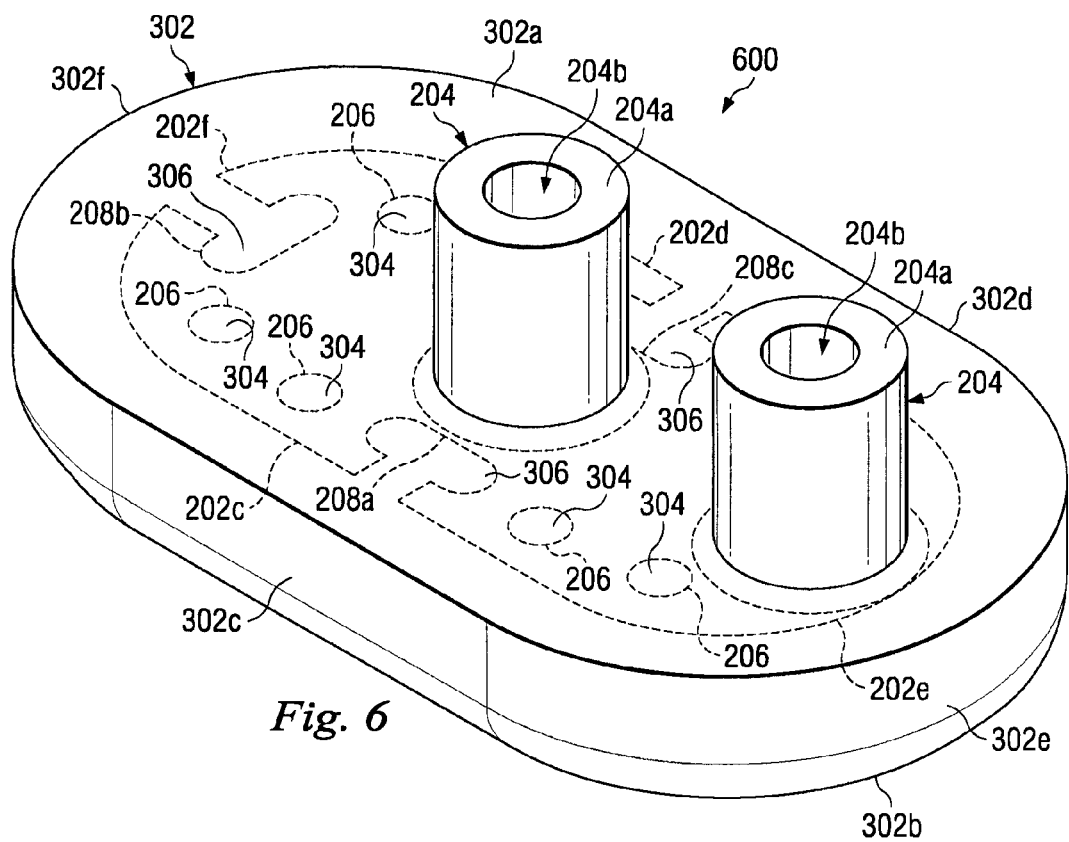
FIG. 6 is a perspective view illustrating an embodiment of a chassis foot apparatus.

Referring now to FIGS. 4b and 6, in an embodiment, a chassis foot apparatus 600 is illustrated that is substantially similar in design and operation to the chassis foot apparatus 300, described above with reference to FIGS. 1, 2, 3a, 3b, 3c, 4a, 4b, 5a, 5b, 5c and 5d, with the provision of asymmetrical posts 204 relative to the symmetry of the posts 204 of chassis foot apparatus 300. The chassis foot apparatus 600 may be used when the IHS housing 404 includes space constraints that do not allow the symmetrical placement of the posts 204 but rather require the posts 204 be offset in order to allow the posts 204 to fit in the IHS housing.

Figure 7A:
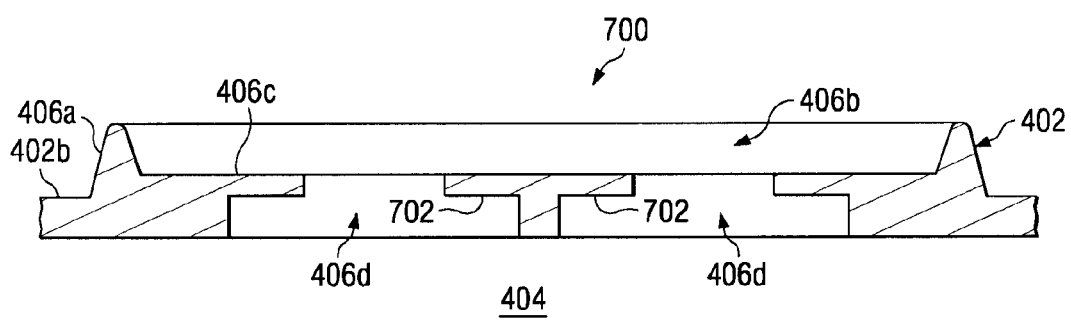
Figure 7B:
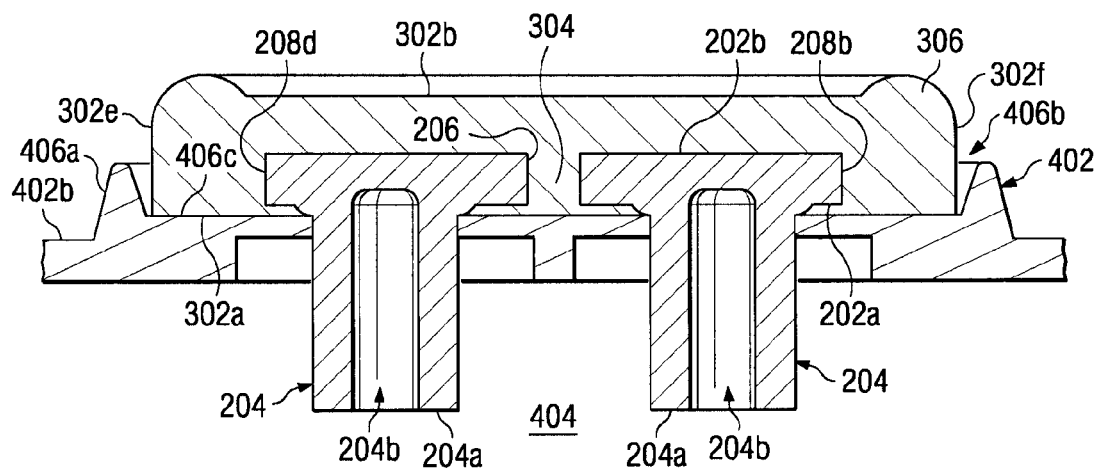
Figure 7C:
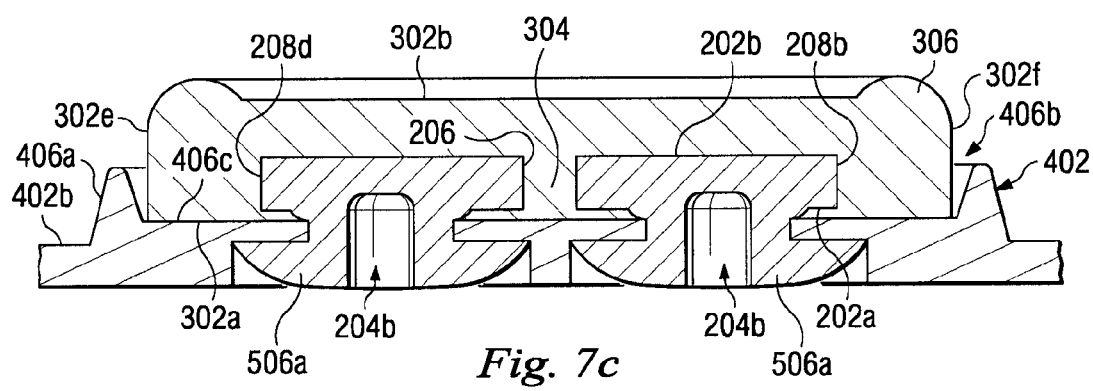

Referring now to FIGS. 7a, 7b and 7c, in an embodiment, an IHS chassis 700 is illustrated that is substantially similar in design and operation to the IHS chassis 400, described above with reference to FIGS. 1, 2, 3a, 3b, 3c, 4a, 4b, 5a, 5b, 5c and 5d, with the provision of flush mount channels 702 defined by the base 402 and located adjacent the foot apertures 406d and between the foot apertures 406d and the IHS housing 404. In operation, the chassis foot apparatus 300 is positioned in the chassis foot apparatus channel 406b and engages the chassis foot apparatus securing surface 406c while the posts 204 enter and extend through respective foot apertures 406d such that the distal ends of the posts 204 are located in the IHS housing 404, as illustrated in FIG. 7b. However, when the posts 204 are deformed, the post securing ends 506a created by the deformation are located in the flush mount channels 702 such that the post securing ends 506a do not extend into the IHS housing 404, as illustrated in FIG. 7c.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A chassis foot apparatus for an information handling system, comprising:
   a base member;
   a resilient member coupled to the base member; and
   at least one post extending from the base member, wherein the at least one post is deformable into engagement with a chassis to couple the base member and the resilient member to the chassis and wherein the base member defines at least one mechanical coupling aperture, whereby a portion of the resilient member is located in the mechanical coupling aperture in order to couple the resilient member to the base member.

2. The apparatus of claim 1, wherein the resilient member and the base member are coupled together by a two shot molding process.

3. The apparatus of claim 1, wherein the resilient member and the base member are coupled together by a chemical bond.

4. The apparatus of claim 1, wherein the at least one post comprises a cylinder partially along its length.

5. The apparatus of claim 1, wherein two posts extend from the base member, whereby each post is deformable into engagement with a chassis to couple the base member and the resilient member to the chassis.

6. The apparatus of claim 1, further comprising:
   an adhesive on a surface that is located adjacent the at least one post.

7. The apparatus of claim 1, wherein the base member and the at least one post are fabricated from a plastic material.

8. The apparatus of claim 1, wherein the at least one post is deformable by a heat staking process.

9. An information handling system (IHS), comprising:
   an IHS chassis defining a housing and at least one foot aperture located adjacent the housing;
   a processor coupled to the IHS chassis; and
   at least one chassis foot apparatus coupled to the IHS chassis, the at least one chassis foot apparatus comprising:
     a base member;
     a resilient member coupled to the base member; and
     at least one post extending from the base member and through the at least one foot aperture, wherein the at least one post has been deformed into engagement with the IHS chassis to couple the base member and the resilient member to the IHS chassis and wherein the base member defines at least one mechanical coupling aperture, whereby a portion of the resilient member is located in the mechanical coupling aperture to couple the resilient member to the base member.

10. The system of claim 9, wherein the resilient member and the base member are coupled together by a two shot molding process.

11. The system of claim 9, wherein the resilient member and the base member are coupled together by a chemical bond.

12. The system of claim 9, wherein two posts extend from the base member and through two foot apertures defined by the IHS chassis, whereby each post has been deformed into engagement with the IHS chassis to couple the base member and the resilient member to the IHS chassis.

13. The system of claim 9, further comprising:
an adhesive located between the chassis foot apparatus and the IHS chassis.

14. The system of claim 9, wherein the base member and the at least one post are fabricated from a plastic material.

15. The system of claim 9, wherein the at least one post has been deformed by a heat staking process.

16. The system of claim 9, wherein a flush mount channel is defined by the IHS chassis and located adjacent the at least one foot aperture, whereby the at least one post that has been deformed is located in the flush mount channel.

17. A method for coupling a chassis foot to a chassis of an information handling system, comprising:
providing a chassis foot apparatus comprising a base member, a resilient member coupled to the base member, and at least one post extending from the base member;
positioning the at least one post in a foot aperture defined by a chassis; and
coupling the chassis foot apparatus to the chassis by deforming the at least one post into engagement with the chassis and wherein the base member defines at least one mechanical coupling aperture, whereby a portion of the resilient member is located in the mechanical coupling aperture to couple the resilient member to the base member.

18. The method of claim 17, wherein the coupling comprises heat staking.

19. The method of claim 17, wherein the providing comprises coupling the resilient member to the base member by a two shot molding process.

* * * * *